United States Patent [19]
Joichi et al.

[11] Patent Number: 5,463,767
[45] Date of Patent: Oct. 31, 1995

[54] DATA TRANSFER CONTROL UNIT WITH MEMORY UNIT FAULT DETECTION CAPABILITY

[75] Inventors: Masahiko Joichi; Yoshihisa Furukawa, both of Tokyo, Japan

[73] Assignee: NEC Corporation, Tokyo, Japan

[21] Appl. No.: 21,680

[22] Filed: Feb. 24, 1993

[30] Foreign Application Priority Data

Feb. 24, 1992 [JP] Japan ..................... 4-072144

[51] Int. Cl.$^6$ ............... G06F 11/00; G06F 7/02
[52] U.S. Cl. .............. 395/183.13; 371/48; 371/67.1; 395/183.18; 395/183.19
[58] Field of Search ............. 371/48, 67.1; 395/200, 395/275, 595, 775, 325, 575

[56] References Cited

U.S. PATENT DOCUMENTS

| | | | |
|---|---|---|---|
| 5,142,627 | 8/1992 | Elliot et al. | 395/275 |
| 5,193,150 | 3/1993 | Takeuchi et al. | 395/200 |
| 5,239,637 | 8/1993 | Davis et al. | 395/425 |
| 5,257,384 | 10/1993 | Farrand et al. | 395/525 |

Primary Examiner—Robert W. Beausoliel, Jr.
Assistant Examiner—Norman M. Wright
Attorney, Agent, or Firm—Sughrue, Mion, Zinn, Macpeak & Seas

[57] ABSTRACT

A data transfer control unit located between a memory unit and at least one peripheral unit comprises a buffer having a plurality of addressable storage locations, and first and second control circuits. In response to a request command given from the peripheral unit, the first control circuit generates an identification number and sends the request command and the identification number to the memory unit. The memory unit outputs to the data transfer control unit the identification number given together with the request command from the first control circuit, after performing a processing requested by the request command. The second control circuit stores the identification number given from the memory unit at a storage location in the buffer. The control unit further comprises a comparator which compares the identification number with the address of the storage location in the buffer at which the identification number is stored.

9 Claims, 3 Drawing Sheets

DATA TRANSFER CONTROL UNIT WITH MEMORY UNIT FAULT DETECTION CAPABILITY

BACKGROUND OF THE INVENTION

The invention relates to a data transfer control unit located between a memory unit and one or more peripheral units.

In information processing systems, a data transfer control unit is provided between a memory unit and one or more peripheral units (e.g., a disk drive) to control data transfer between the memory unit and the peripheral units. In a typical data transfer operation, a peripheral unit sends a transfer request command to the data transfer control unit which then issues a memory request command to the memory unit. In response to the memory request command, the memory unit performs either a read or a write operation processing depending on the contents of the transfer request command and then sends reply information to the control unit.

However, prior art data transfer control units have no adequate fault detection capability to detect various faults which may occur in the memory unit. Faults which may occur in the memory unit include the following: the operation required by a transfer request command given from the peripheral unit was not performed in the memory unit; a command disappearance took place in the memory unit; and a plurality of pieces of reply information were issued from the memory unit in response to a single memory request command.

SUMMARY OF THE INVENTION

An object of the invention is therefore to provide a data transfer control unit with a fault detection capability.

According to an aspect of the invention, there is provided a data transfer control unit including one or more channel sections and located between a memory unit and one or more peripheral units.

Each channel section comprises a first storage circuit having a plurality of addressable storage locations, and a first control circuit responsive to a request command given from a corresponding one of the peripheral units for generating an identification number and sending the request command and the identification number to the memory unit. The memory unit performs an appropriate processing operation requested by the request command, and then sends back the identification number and reply information to the data transfer control unit. Each channel section further comprises a second control circuit for storing the identification number given from the memory unit at a storage location in the first storage circuit, and first comparison circuit for comparing the thus-stored identification number with the address of the storage location in the first storage circuit at which the identification number is stored.

The identification number sequentially advances for each sequential request from the peripheral unit. The address of the storage location also sequentially advances upon receipt of reply data from the memory unit. Thus, the identification number and address can be compared to determine whether a fault has occurred in the operation of the memory unit.

BRIEF DESCRIPTION OF THE DRAWINGS

Other features and advantages of the invention will become apparent from the following detailed description when taken in conjunction with the accompanying drawings, in which.

In the drawings, the same reference numerals represent the same structural elements.

DETAILED DESCRIPTION OF THE PREFERRED EMBODIMENT OF THE INVENTION

Figure 1:
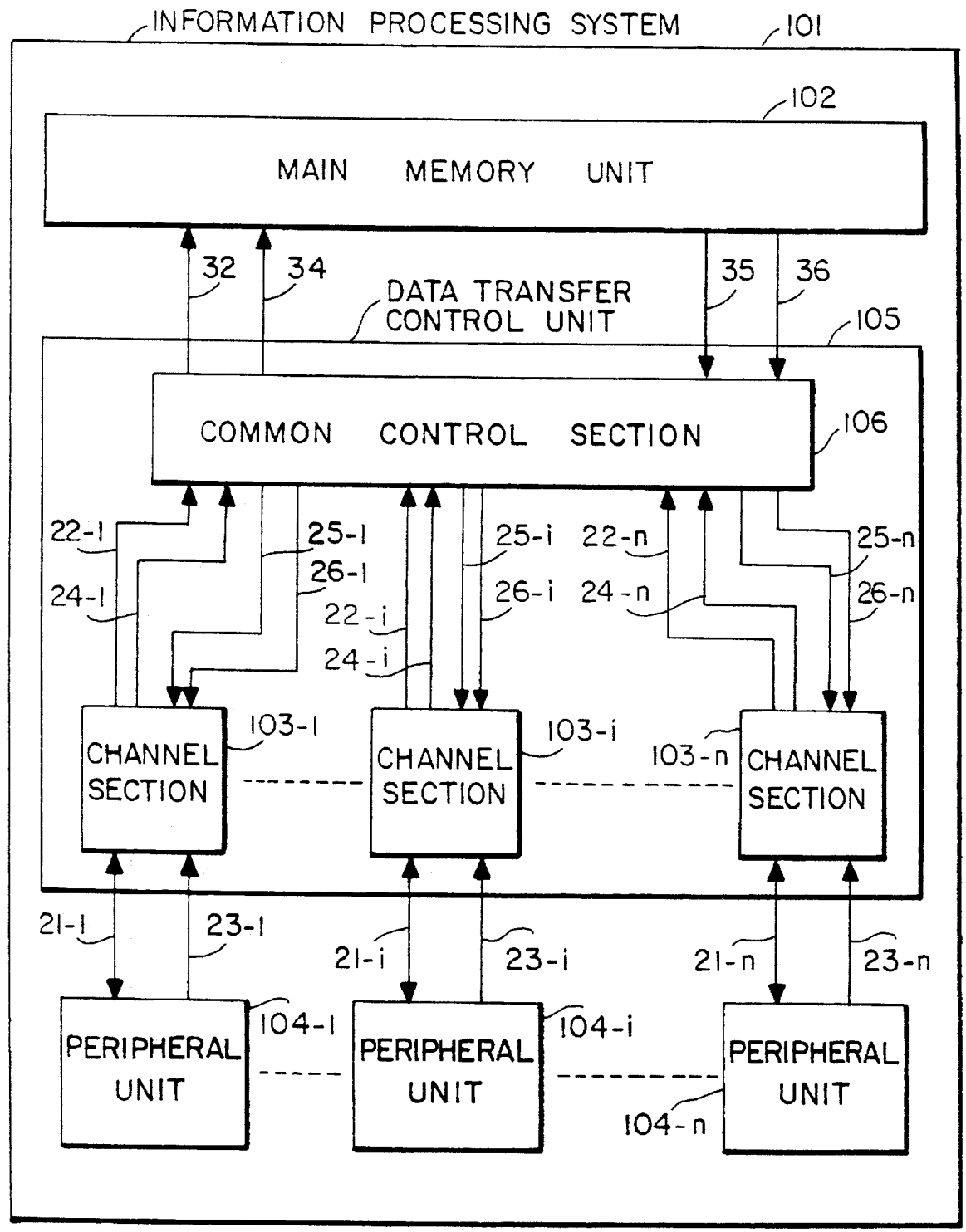
FIG. 1 is a block diagram of an information processing system.

Referring to FIG. 1, an information processing system 101 comprises a central processing unit (not shown), a main memory unit 102, a data transfer control unit 105 and a plurality of peripheral units 104.

The data transfer control unit 105 includes a plurality of channel sections 103-1 to 103-n and a common control section 106. The channel sections 103-1 to 103-n are connected to the associated peripheral units 104-1 to 104-n, respectively, via paths 21-1 to 21-n and 23-1 to 23-n. The channel sections 103-1 to 103-n are assigned unique channel numbers, respectively, and have the same construction as each other. The channel sections 103-1 to 103-n are also connected to the common control section 106 via paths 22-1 to 22-n, 24-1 to 24-n, 25-1 to 25-n and 26-1 to 26-n.

Figure 2:
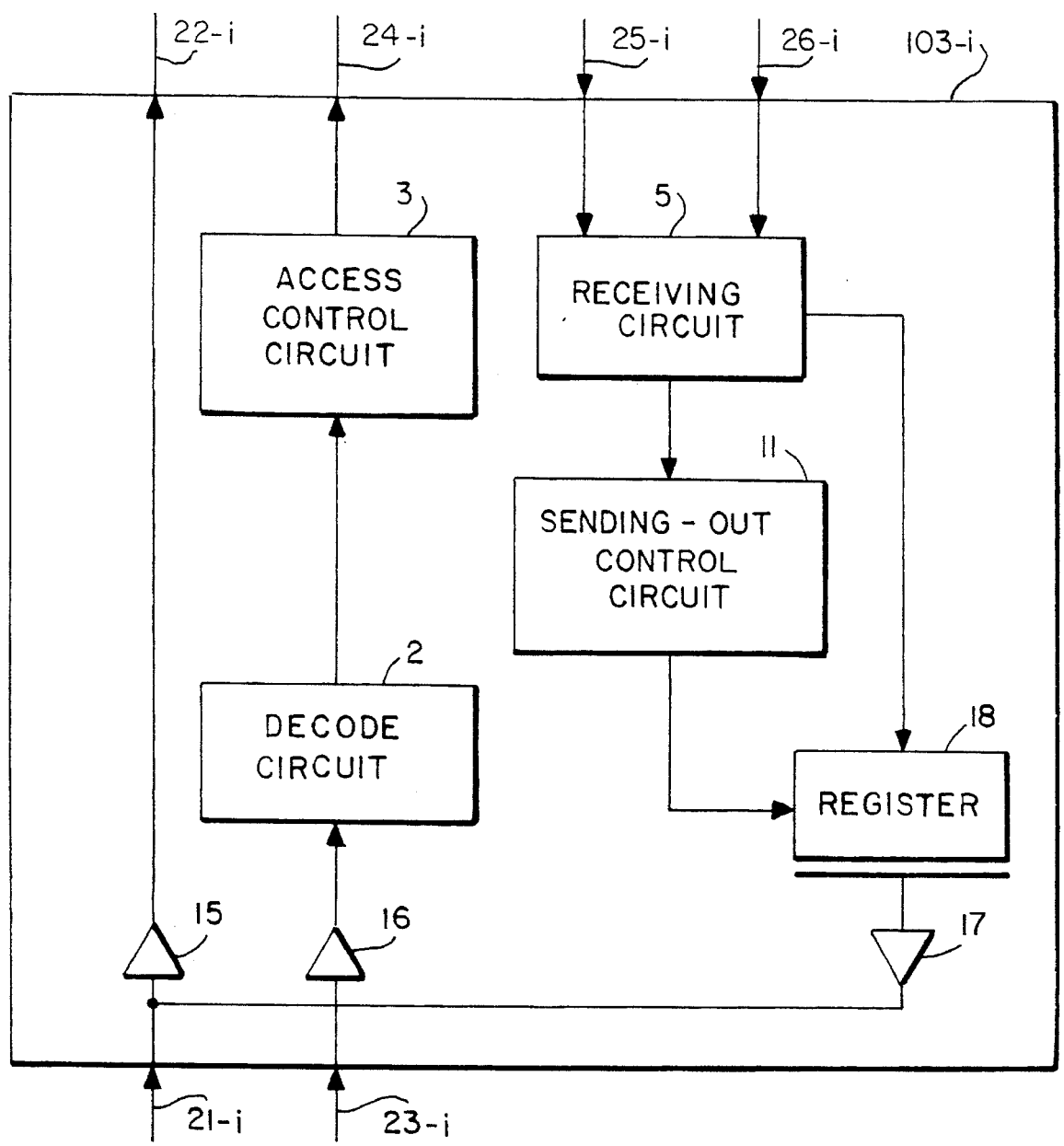
FIG. 2 is a block diagram of a prior art data transfer control unit.

Referring to FIG. 2, a prior art channel section 103-i comprises a data path 21-i for sending transfer data from the associated peripheral unit 104-i to the memory unit 102 via an amplifier 15 and a data path 22-i, a transfer request command decode circuit 2 for receiving a transfer request command from the peripheral unit 104-i via a path 23-i and an amplifier 16 and decoding the command, a memory access control circuit 3 for receiving the decoded result from the circuit 2, generating a memory request command on the basis of the decoding result and sending it to the memory unit 102, a memory reply receiving circuit 5 for receiving reply information and reply data via paths 25-i and 26-i, respectively, from the memory unit 102, a data sending-out control circuit 11 for controlling transfer of data to the peripheral unit 104-i on the basis of the reply information, a register 18 for receiving the reply data from the circuit 5, and an amplifier 17.

Description will next be made on the operation of the prior art channel section 103-i.

First, the peripheral unit 104-i connected to the channel section 103-i sends a transfer request command to the decode circuit 2 via the path 23-i. The transfer request command includes a mode field for instructing the memory unit 102 to read data out thereof (a read operation) or to store data therein (a write operation) and an address field indicating an address in memory 102 which is to be read from in the case of the read operation or an address in memory 102 which is to be written to in the case of the write operation. In the write operation, the unit 104-i sends out write data to the path 21-i, in addition to the transfer request command. The decode circuit 2 receives the transfer request command, decodes it to a form acceptable by the memory 102 and informs the access control circuit 3 of the decoded result. In response to the decoded result, the access control circuit 3 generates a memory request command which has a mode field, an address field, a channel number field containing a channel number assigned to the channel section 103-i and an identification field containing an identification number. The identification numbers start at zero and progress sequentially, one for each transfer request command. The mode field and address field are similar in meaning to but different in format from those included in the transfer request command. That is, the contents are the same but the information has been decoded by the decode circuit 3. The access control circuit 3 sends out the memory request command to the path 24-i.

The common control section 106 receives and transfers the memory request command to the memory unit 102 via a path 34.

The memory unit 102 receives the memory request command. If the mode field in the memory request command indicates a write operation, the memory unit 102 stores data given from the peripheral unit 104-i via the paths 21-i and 22-i, the common control section 106 and the path 32 at a location therein specified by the address field in the command. If the mode field indicates a read operation, the memory unit 102 reads out data from the location therein specified by the address field in the command to the path 36. Thereafter, the memory unit 102 sends out reply information to the path 35. In the case of the read operation, at this time, the memory unit 102 sends out the read-out data to the path 36. The reply information includes a mode field, an address field, a channel number field and an identification field whose contents are the same as those of the memory request command if a fault has not taken place. That is, the four fields are simply passed through the memory 102 and sent back to the transfer control unit 105.

The common control section 106 checks the channel number field of the reply information and transfers the reply information to the channel section 103-i specified by the channel number field via the path 25-i.

The receiving circuit 5 in the channel section 103-i receives the reply information and, if any, the data given from the memory unit 102 via the path 36, the section 106 and the path 26-i. The circuit 5 sends the reply information and the data to the control circuit 11 and the register 18, respectively. The register 18 holds the data and, in response to a control signal given by the control circuit 11, sends them to the peripheral unit 104-i via amplifier 17 and the path 21.

Description will next be made of a preferred embodiment of the invention.

Figure 3:
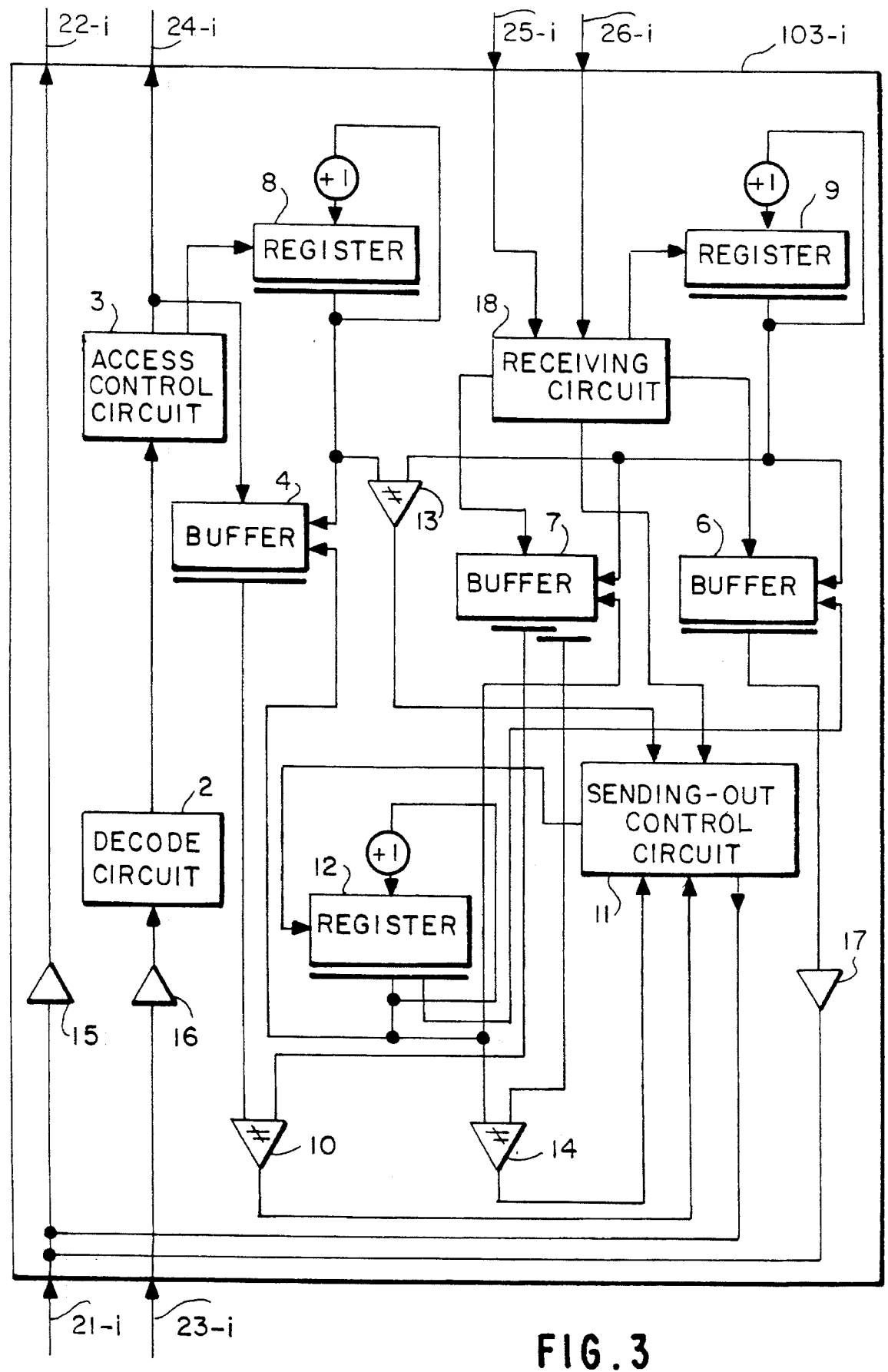
FIG. 3 is a block diagram of an embodiment of the invention.

Referring to FIG. 3, a channel section 103-i according to the invention comprises a transfer request command decode circuit 2, a memory access control circuit 3, a request information storage buffer 4, a read data storage buffer 6, a reply information storage buffer 7, write address registers 8 and 9, a read address register 12, comparators 10, 13 and 14, a data sending-out control circuit 11, a memory reply receiving circuit 18, amplifiers 15 and 16, an amplifier 17, and paths 21-i, 22-i, 23-i, 24-i, 25-i and 26-i. The contents of the registers 8, 9 and 12 are set to be identical when the operation of the control unit 105 is started. In the preferred embodiment, all registers are cleared when the operation is started.

The peripheral unit 104-i connected to the channel section 103-i sends a transfer request command to the decode circuit 2 via the path 23-i. The transfer request command is the same as that used in the prior art channel section 103-i in FIG. 2. In the write operation, the unit 104-i sends out write data to the path 21-i, in addition to the transfer request command.

The decode circuit 2 receives the transfer request command, decodes it and informs the access control circuit 3 of the decoded result. In response to the decoded result, the access control circuit 3 generates a memory request command which is the same as that used in the prior art channel section 103-i in FIG. 2. The control circuit 3 sends out the memory request command to the path 24-i, and issues a control signal to the register 8 which then sends out a write address to the buffer 4. The buffer 4 also receives the command from the circuit 3 and stores it at a location therein specified by the write address given from the register 8. The identification number in the memory request command is generated in the access control circuit 3 and is sequentially updated each time a command is input to the control circuit 3 and is always equal to the write address in the register 8. That is, sequential identification numbers are used, by the access control circuit 3 and respective sequential write addresses are used by the write address register 8. In this way, for a particular memory request command, the identification number generated by the access control circuit 3 will always be equal to the write address in the write address register 8. This means that a memory request command is stored at a location in the buffer 4 specified by a write address which is equal to the identification number included in the command.

Thereafter, the contents of the register 8 is incremented by one.

The memory unit 102 receives the memory request command from the control circuit 3 via the path 24-i, the section 106 and the path 34. If the mode field in the command indicates a write operation, the memory unit 102 stores data given from the peripheral unit 104-i via the path 22-i, section 106 and the path 32 at a location therein specified by the address field in the command. If the mode field indicates a read operation, the memory unit 102 reads out data from the location therein specified by the address field in the command. Thereafter, the memory unit 102 sends out reply information to the path 35. In the case of the read operation, at the same time, the memory unit 102 sends out the read-out data to the path 36. The reply information includes a mode field, an address field, a channel number field and an identification field whose contents are the same as those of the memory request command if a fault has not taken place during the operation of the memory unit 102. The common control section 106 checks the channel number field of the reply information and transfers the reply information to the channel section 103-i specified by the channel number field via the path 25-i.

The receiving circuit 18 in the channel section 103-i receives the reply information and, if any, the data from the memory unit 102 via the path 36, the section 106 and the path 26-i. The circuit 18 informs the buffers 6 and 7 of the arrival of the reply information, and sends a control signal to the register 9 which then sends a write address to the buffers 6 and 7. The circuit 18 also sends the reply information to the sending out control circuit 11. The buffer 7 stores the reply information at a location therein specified by the write address given from the register 9. The buffer 6 stores the read data given from the path 26-i via the circuit 18 at a location therein specified by the write address given from the register 9. Then, the content of the register 9 is incremented by one.

The comparator 10 compares the mode field and channel number field of the memory request command stored at a location in the buffer 4 specified by a read address given from the register 12 with the mode field and channel number field of the reply information stored at a location in the buffer 7 specified by the read address given from the register 12, and informs the control circuit 11 of the comparison result. Therefore, the problem in the prior art of the memory 102 not performing the request required by the transfer request command is detectable by the comparison of these mode fields according to the invention. Further, the problem in the prior art of the reply information being sent to a wrong channel section is detectable by the comparison of these channel number fields according to the invention.

The comparator 13 compares the write address in the register 8 with the write address in the register 9 to see if the number of reply information units exceeds the number of memory request commands, and notifies the control circuit 11 of the comparison result. Therefore, the problem in the prior art of the memory 102 issuing a plurality of units of reply information in response to a single transfer request command is detectable according to the invention.

The comparator 14 compares the read address in the register 12 with the identification number of reply information stored at a location in the buffer 7 specified by the read address in the register 12, and informs the control circuit 11 of the comparison result.

For example, where a memory request command disappears in the memory unit 102 and the next memory request command following the disappeared request command is normally processed in the memory unit, only reply information corresponding to the next memory request command is sent to the receiving circuit 18 from the memory unit 102 and is then stored at a location in the buffer 7 specified by a write address in the register 9. However, since the location at which the reply information corresponding to the next memory request command is stored is the location at which reply information corresponding to the disappeared memory request command was to be stored, the address of the location is not equal to the identification number included in the reply information stored at the location. Such a fault as the request command disappearance can be detected by the comparator 14.

The control circuit 11 analyzes these comparison results. As a result, if it judges that no fault took place in the memory unit 102 or the common control section 106, the circuit 11 checks the mode field of the reply information sent from the circuit 18. If the mode field indicates the write operation, the content of the register 12 is incremented by one. If the mode field indicates the read operation, the circuit 11 sends a control signal to the register 12. In response to the control signal, the register 12 gives the buffer 6 the read address stored therein. The buffer 6 reads reply data out of the location therein specified by the read address, and sends them to the peripheral unit 104-i via the driver 17 and the path 21-i. Thereafter, the content of the register 12 is incremented by one.

However, if the comparators inform the sending out control circuit 11 that a fault has been detected, then the sending out control circuit 11 can now inform the peripheral unit 104-i that a fault has been detected so that the request which has been improperly processed can be resent.

As mentioned above, in the embodiment, the channel section 103-i can detect the following faults: the operation required by a transfer request command given from the peripheral unit 104 was not performed in the memory unit 102 (detected at comparator 10); reply information to be sent to another channel section was received (detected at comparator 10); a command disappearance took place in the memory unit 102 (detected at comparator 14); and a plurality of pieces of reply information were issued from the memory unit 102 in response to a single memory request command (detected at comparator 13).

What is claimed is:

1. A data transfer control unit including a plurality of channel sections, said unit provided between a memory unit and a plurality of peripheral units, each of said channel sections comprising:

first storage means having a plurality of addressable storage locations;

first control means responsive to a request command given from a corresponding one of said peripheral units for generating an identification number and sending said request command and said identification number to said memory unit;

second control means for storing said identification number sent out from said memory unit, after said memory unit processes said request command, at a designated storage location in said first storage means, said designated storage location corresponding to said identification number; and first comparison means connected to said first storage means for comparing said identification number with an address representing said storage location where said identification number is stored in said first storage means.

2. A data transfer control unit as claimed in claim 1, wherein said second control means includes a first write register holding a first write address representing said storage location where said identification number is stored in said first storage means.

3. A data transfer control unit as claimed in claim 2, wherein each of said channel sections further comprises:

second storage means having a plurality of addressable storage locations for storing said identification number generated by said first control means;

a second write register holding a second write address representing a storage location where said identification number generated by said first control means is stored in said second storage means, said write address corresponding to said identification number; and second comparison means for checking whether said first write address in said first write register is larger than said second write address in said second write register.

4. A data transfer control unit as claimed in claim 1, wherein each of said channel sections further comprises:

second storage means having a plurality of addressable storage locations for storing said identification number generated by said first control means and operation mode information included in said request command;

a write register holding a write address representing a storage location where said identification number generated by said first control means and said operation mode information are stored in said second storage means;

a read address register connected to said first and second storage means;

said first storage means further storing operation mode information sent out from said memory unit after said memory unit processes said request command; and third comparison means for comparing operation mode information stored at a location in said first storage means specified by said read address register, with operation mode information stored at a location in said second storage means specified by said read address register.

5. A data transfer control unit as claimed in claim 1, further comprising a common control means, and wherein each of said channel sections further comprises:

second storage means having a plurality of addressable storage locations for storing said identification number generated by said first control means and a channel number assigned to the channel section;

a write register holding a write address representing a storage location where said identification number generated by said first control means and said channel number are stored in said second storage means;

a read address register connected to said first and second storage means;

said first storage means further storing a channel number sent out from said common control means after said memory unit processes said request command; and third comparison means for comparing a channel number stored at a location in said first storage means specified by said read address register, with a channel number at a storage location in said second storage means specified by said read address register.

6. A data transfer control unit including a plurality of channel sections said unit provided between a memory unit and a plurality of peripheral units, each of said channel sections comprising:

first and second storage means each having a plurality of addressable storage locations;

a read address register connected to said first and second storage means;

first control means for storing operation mode information included in a request command given from a corresponding one of said peripheral units at a storage location in said second storage means;

second control means for storing operation mode information given from said memory unit at a storage location in said first storage means after said memory unit processes said request command; and first comparison means for comparing operation mode information at a storage location in said first storage means specified by said read address register, with operation mode information at a storage location in said second storage means specified by said read address register.

7. A data transfer control unit including a plurality of channel sections and a common control section, said unit provided between a memory unit and a plurality of peripheral units, each of said channel sections comprising:

first and second storage means each having a plurality of addressable storage locations;

a read address register connected to said first and second storage means;

first control means for storing a channel number assigned to the channel section at a storage location in said second storage means;

second control means for storing a channel number given from said common control section at a storage location in said first storage means after said memory unit processes a request command given from a corresponding one of said peripheral units; and comparison means for comparing a channel number at a storage location in said first storage means specified by a read address held by said read address register with a channel number at a storage location in said storage means specified by said read address.

8. A fault detection apparatus in a data transfer control unit which is provided between a memory unit and at least one peripheral unit, comprising:

first receiving means for receiving a request command from said at least one peripheral unit;

transmitting means for transmitting said request command to said memory unit;

second receiving means for receiving reply data from said memory unit after said memory unit processed said request command;

fault detection means including a plurality of comparator means for comparing said information corresponding to said request command with said information corresponding to said reply data for detecting faults in the operation of said memory unit by analyzing information corresponding to said request command and information corresponding to said reply data;

a first memory means for storing said request command;

a second memory means for storing said reply data; and wherein at least one of said plurality of comparator means compares an address related to said first memory means with an address related to said second memory means.

9. An apparatus according to claim 8 wherein one of said comparator means compares operation mode data of said request command with operation mode data of said reply data.

* * * * *